United States Patent
Kuo (10) Patent No.: US 9,739,630 B2
(45) Date of Patent: Aug. 22, 2017

(54) ADJUSTING A MAP AREA DISPLAYED ON A PORTABLE ELECTRONIC DEVICE ACCORDING TO DETECTED SPEED

(71) Applicant: Juhang Kuo, San Dimas, CA (US)

(72) Inventor: Juhang Kuo, San Dimas, CA (US)

(73) Assignee: MITAC INTERNATIONAL CORP., Taoyuan (TW)

(*) Notice: Subject to any disclaimer, the term of this patent is extended or adjusted under 35 U.S.C. 154(b) by 249 days.

(21) Appl. No.: 14/147,595

(22) Filed: Jan. 6, 2014

(65) Prior Publication Data
US 2015/0192424 A1    Jul. 9, 2015

(51) Int. Cl.
G01C 21/36    (2006.01)

(52) U.S. Cl.
CPC .................. *G01C 21/367* (2013.01)

(58) Field of Classification Search
CPC .............. G01C 21/367; G01C 21/3667; G01C 21/3664
See application file for complete search history.

(56) References Cited

U.S. PATENT DOCUMENTS

2012/0109516 A1* 5/2012 Miyazaki ............. G09B 29/102
                                                       701/428
2014/0149909 A1* 5/2014 Montes .................. B60K 35/00
                                                       715/771

* cited by examiner

*Primary Examiner* — Mussa A Shaawat
*Assistant Examiner* — Michael Kerrigan
(74) *Attorney, Agent, or Firm* — Winston Hsu (57) ABSTRACT

A method of adjusting a map area displayed on a portable electronic device includes displaying a map of a current location of the portable electronic device on a display of the portable electronic device, calculating a current speed of the portable electronic device, and adjusting data shown on the display by hiding menu information and increasing a size of the displayed map when the current speed of the portable electronic device is greater than a threshold value.

14 Claims, 8 Drawing Sheets

ADJUSTING A MAP AREA DISPLAYED ON A PORTABLE ELECTRONIC DEVICE ACCORDING TO DETECTED SPEED

BACKGROUND OF THE INVENTION

1. Field of the Invention

The invention relates to a method of displaying map data on a portable electronic device, and more particularly, to a method and related device for adjusting menu information and a map area displayed on the portable electronic device according to a current speed of the portable electronic device.

2. Description of the Prior Art

Global Positioning System (GPS) based navigation devices are well known and are widely employed as in-car navigation devices. Common functions of a navigation device include providing a map database for generating navigation instructions that are then shown on a display of the navigation device. These navigation devices are often mounted on or in the dashboard of a vehicle using a suction mount or other mounting means.

The term "navigation device" refers to a device that enables a user to navigate to a pre-defined destination. The device may have an internal system for receiving location data, such as a GPS receiver, or may merely be connectable to a receiver that can receive location data. The device may compute a route itself, or communicate with a remote server that computes the route and provides navigation information to the device, or a hybrid device in which the device itself and a remote server both play a role in the route computation process. Personal GPS navigation devices are not permanently integrated into a vehicle but instead are devices that can readily be mounted in or otherwise used inside a vehicle. Generally (but not necessarily), they are fully self-contained—i.e. include an internal GPS antenna, navigation software and maps and can hence plot and display a route to be taken.

Personal navigation devices typically show map data and menu information on a same screen. The user may select an item contained in the menu information in order to perform certain tasks, such as setting up a new destination that the user wishes to receive navigation instructions to. However, at other times, such as when the user is traveling at a high rate of speed, the user has no need for the menu information. Not only does the menu information take up space that could better be used for displaying other information, but the user may also be tempted to select menu options while the user is traveling at the high rate of speed. Thus, displaying the menu data while the user is traveling at a high rate of speed can be both distracting to the user as well as dangerous.

Therefore, there is a need for a convenient way of hiding the menu data during times when the menu data is not needed or not safe to be used.

SUMMARY OF THE INVENTION

It is therefore one of the primary objectives of the claimed invention to provide a method and related device for adjusting a map area displayed on a portable electronic device according to a detected speed of the portable electronic device.

According to an exemplary embodiment of the claimed invention, a method of adjusting a map area displayed on a portable electronic device is disclosed. The method includes displaying a map of a current location of the portable electronic device on a display of the portable electronic device, calculating a current speed of the portable electronic device, and adjusting data shown on the display by hiding menu information and increasing a size of the displayed map when the current speed of the portable electronic device is greater than a threshold value.

According to another exemplary embodiment of the claimed invention, a portable electronic device for adjusting a displayed map area is disclosed. The portable electronic device includes a display for displaying a map of a current location of the portable electronic device, a memory for storing map data, and a processor for calculating a current speed of the portable electronic device, and adjusting data shown on the display by hiding menu information and increasing a size of the displayed map when the current speed of the portable electronic device is greater than a threshold value.

It is an advantage that the present invention provides a way to automatically adjust both the map area and the menu information shown on the display of the portable electronic device. Not only is the map area maximized when the current speed of the portable electronic device is greater than the threshold value, but safety is also ensured by hiding the menu information and discouraging the user from selecting menu items while the speed of the portable electronic device is greater than the threshold value.

These and other objectives of the present invention will no doubt become obvious to those of ordinary skill in the art after reading the following detailed description of the preferred embodiment that is illustrated in the various figures and drawings.

DETAILED DESCRIPTION

The present invention provides a way to automatically adjust menu information as well as a map area shown on a display of a portable electronic device as a vehicle that the portable electronic device is located in changes speed. When the vehicle's speed is lower than a threshold value, the menu information is displayed on a display of the portable electronic device so a user can be given the opportunity to control operations of the portable electronic device. On the other hand, when the vehicle's speed is greater than the threshold value, it is no longer safe for the user to be using the menu information to control operation of the portable electronic device. Therefore, the menu information is hidden and the space on the display that was previously dedicated to displaying the menu information is instead used to display additional map data for providing a larger map area. When the vehicle is traveling at a high speed, the present invention not only increases the safety of using the portable electronic device, but also provides the user with additional area with which to view the map data.

Figure 1:
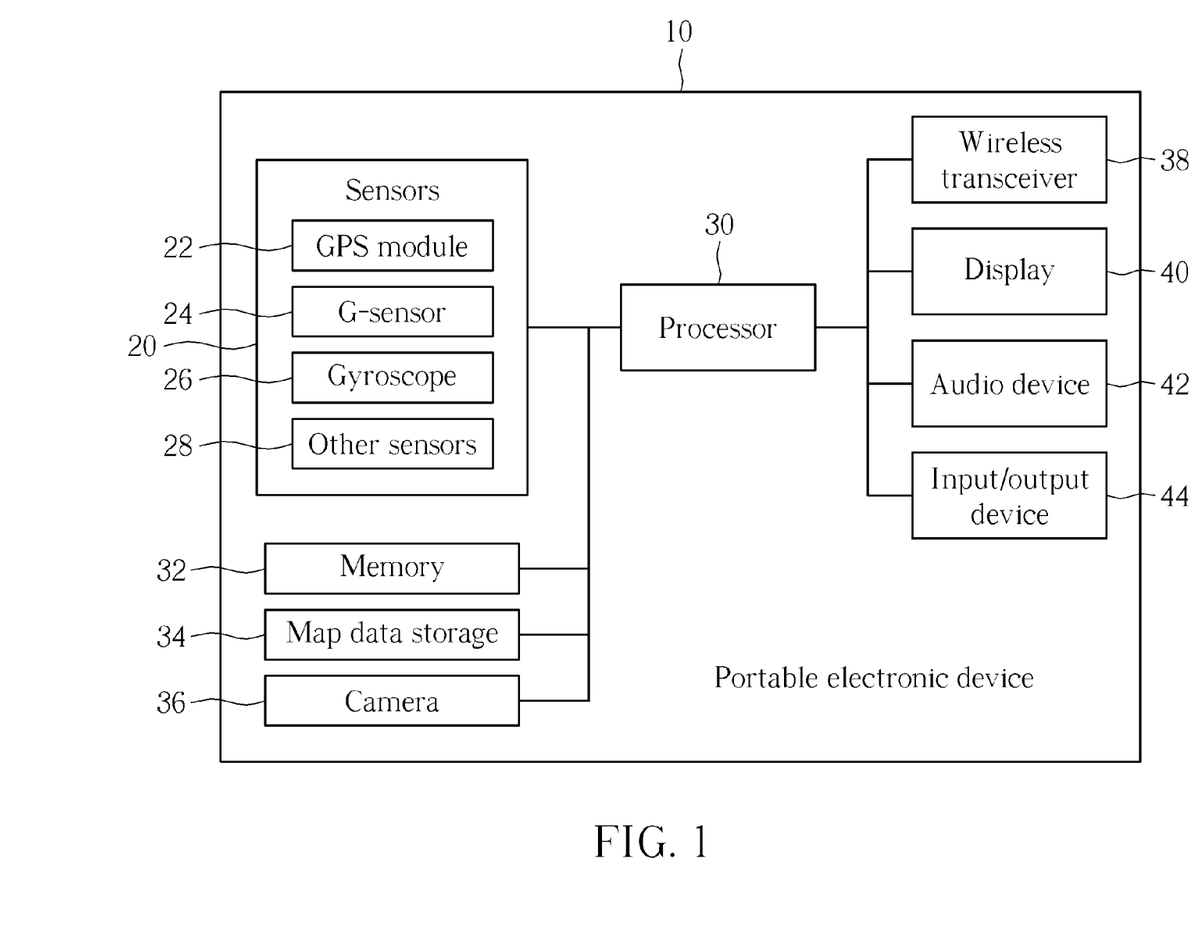
FIG. 1 is a block diagram of a portable electronic device according to the present invention.

Please refer to FIG. 1. FIG. 1 is a block diagram of a portable electronic device 10 according to the present invention. The portable electronic device 10 may be a mobile phone or a personal navigation device, which is also referred to as a GPS device. The portable electronic device 10 may also be implemented in other devices that are capable of displaying maps for helping the user to navigate to a destination.

The portable electronic device 10 contains a sensor module 20 containing a plurality of sensors. A first type of sensor is a GPS module 22 used to detect a current position of the portable electronic device 10. By monitoring the current position of the portable electronic device 10 over time, it is possible to calculate a driving speed of the vehicle in which the portable electronic device 10 is placed. The sensor module 20 may also contain other sensors such as a g-sensor 24 such as an accelerometer, a gyroscope 26, and other sensors 28. Using data collected by one or more sensors of the sensor module 20 over time, the portable electronic device 10 is able to determine the current speed that the vehicle is traveling at.

The portable electronic device 10 also includes a processor 30 for controlling operation of the portable electronic device 10. The portable electronic device 10 further contains a memory 32 for storing program code being executed by the processor 30 and map data storage 34 for storing map data, address data, parking area information, etc. A camera 36 is provided for allowing the user to take pictures with the portable electronic device 10. The portable electronic device 10 further contains a wireless transceiver 38 for providing the portable electronic device 10 with the ability to communicate wirelessly, and the wireless transceiver 38 may be a cellular transceiver, a WiFi transceiver, a Bluetooth® transceiver, or others. The portable electronic device 10 also contains a display 40 for, among other things, letting the user see map data and menu data and for presenting routing instructions to the user. An audio device 42 can be used for outputting an audible alert to the user. The portable electronic device 10 may also contain any kind of input/output device 44 for interacting with the portable electronic device 10, such as a touch screen, or other items such as a keyboard or an external peripheral device.

The memory 32 may also store the threshold value that is compared to the current speed of the vehicle for determining whether to alter the map data and the menu information shown on the display 40. The processor 30 can calculate the current speed at which the portable electronic device 10 is moving by tracking the change in position supplied by the GPS module 22 over time, or by calculating the current speed based on the cumulative sensing data output by the g-sensor 24, the gyroscope 26, or the other sensors 28 in the sensor module 20.

Figure 2:
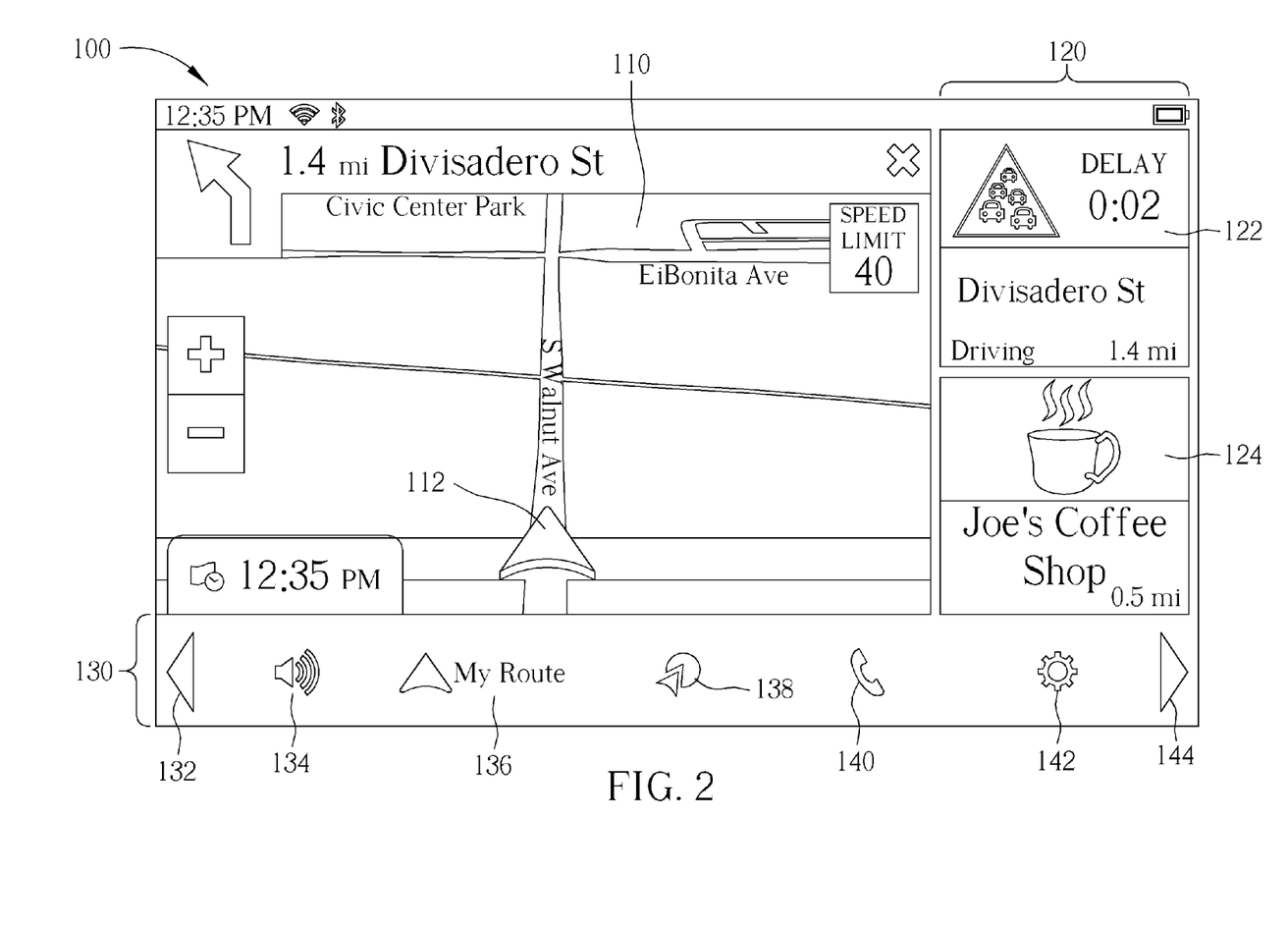
FIG. 2 is a diagram illustrating a screen shown on a display of the portable electronic device in which map data is shown in a map area along with menu information in the form of a menu bar.

Please refer to FIG. 2. FIG. 2 is a diagram illustrating a screen 100 shown on the display 40 of the portable electronic device 10 in which map data is shown in a map area 110 along with menu information in the form of a menu bar 130. The map area 110 shows a map of the area surrounding the current position of the portable electronic device 10, and this current position is indicated by triangle 112. To the right of the map area 110 is a point of interest (POI) area 120 containing information on POIs and other helpful information that the user may wish to view. In FIG. 2 there are two blocks 122, 124 shown in the POI area 120. The block 122 shows information pertaining to a delay in reaching the street that the user will be traveling to next. The block 124 indicates that a coffee shop is coming up ahead.

The menu bar 130 contains several icons that are selectable by the user. Icons 132 and 144 allow the user to control how many blocks are shown in the POI area 120 at one time. By pressing icon 132, additional blocks can be added to the POI area 120 in increments, and blocks can be added until the entire screen 100 is filled with the POI area 120. On the other hand, by pressing icon 144, blocks can be removed from the POI area 120 in increments, and this may continue until the POI area 120 is completely removed from the screen 100.

The menu bar also contains icon 134, which allows the user to adjust the volume of the audio device 42. Icon 136 allows the user to check on or modify the route that the user is currently traveling on. Icon 138 allows the user to bring up an address book stored in the memory 32 of the portable electronic device 10. Icon 140 allows the user to make a phone call using the portable electronic device 10. Icon 142 allows the user to access the settings and preferences for the portable electronic device 10.

Figure 3:
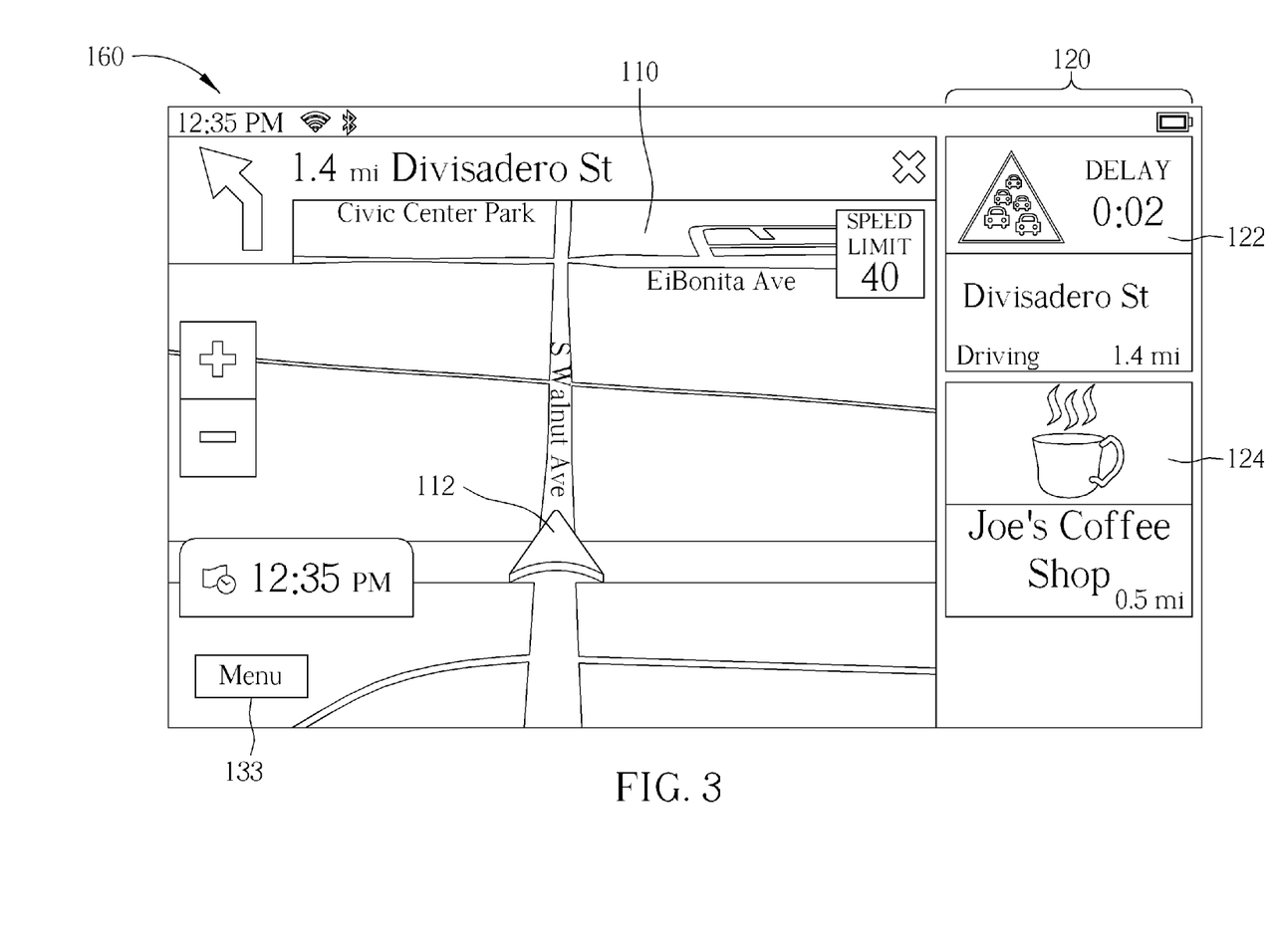
FIG. 3 is a diagram illustrating a screen shown on the display of the portable electronic device in which the menu bar has been replaced by a small icon and the map area has been enlarged.
Figure 3A:
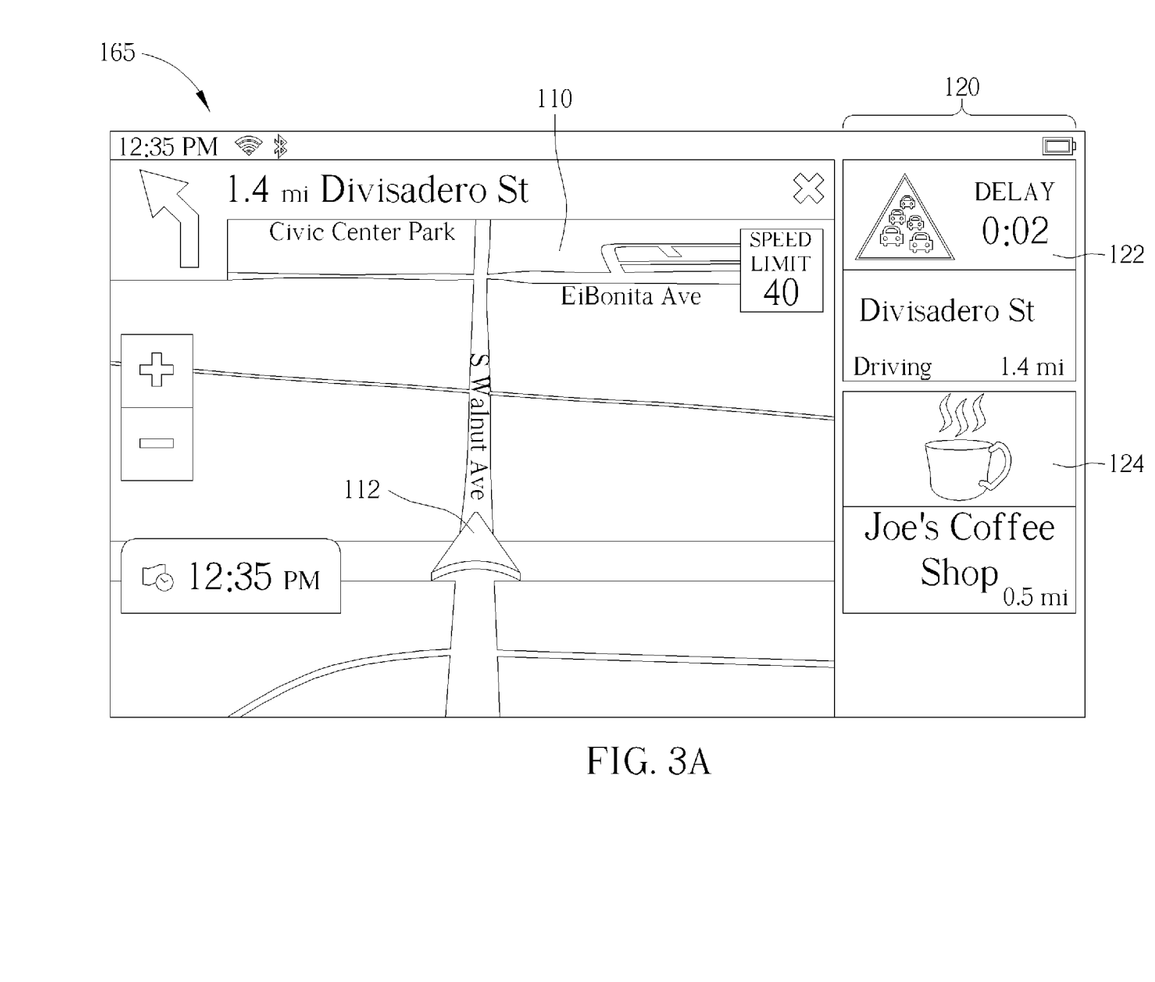
FIG. 3A is a diagram illustrating a screen shown on the display of the portable electronic device in which the menu bar has been hidden completely and the map area has been enlarged.

Please refer to FIG. 3 and FIG. 3A. FIG. 3 is a diagram illustrating a screen 160 shown on the display 40 of the portable electronic device 10 in which the menu bar 130 has been replaced by a small icon 133 and the map area 110 has been enlarged. FIG. 3A is a diagram illustrating a screen 165 shown on the display 40 of the portable electronic device 10 in which the menu bar 130 has been hidden completely and the map area 110 has been enlarged. From comparing screen 100 of FIG. 2 with screen 160 of FIG. 3 and screen 165 of FIG. 3A, it can be seen that the only differences are that in FIG. 3 and FIG. 3A the space previously occupied by the menu bar 130 is now occupied by the map area 110. The menu bar 130 can be hidden completely, as shown in FIG. 3A, for preventing the user from accessing any of the menu data and menu functions. Alternatively, the menu bar 130 can be replaced with a small icon 133, as shown in FIG. 3, that serves as a link to the menu bar 130 when the icon 133 is selected and activated. In effect, the map area 110 in FIG. 3 and FIG. 3A now has more space available for displaying the map data contained therein as compared to FIG. 2. In the present invention, the way that the menu bar 130 and the map area 110 area are displayed can be altered according to the current speed of the vehicle in which the portable electronic device 10 is located, as will be explained in greater detail below.

Figure 4:
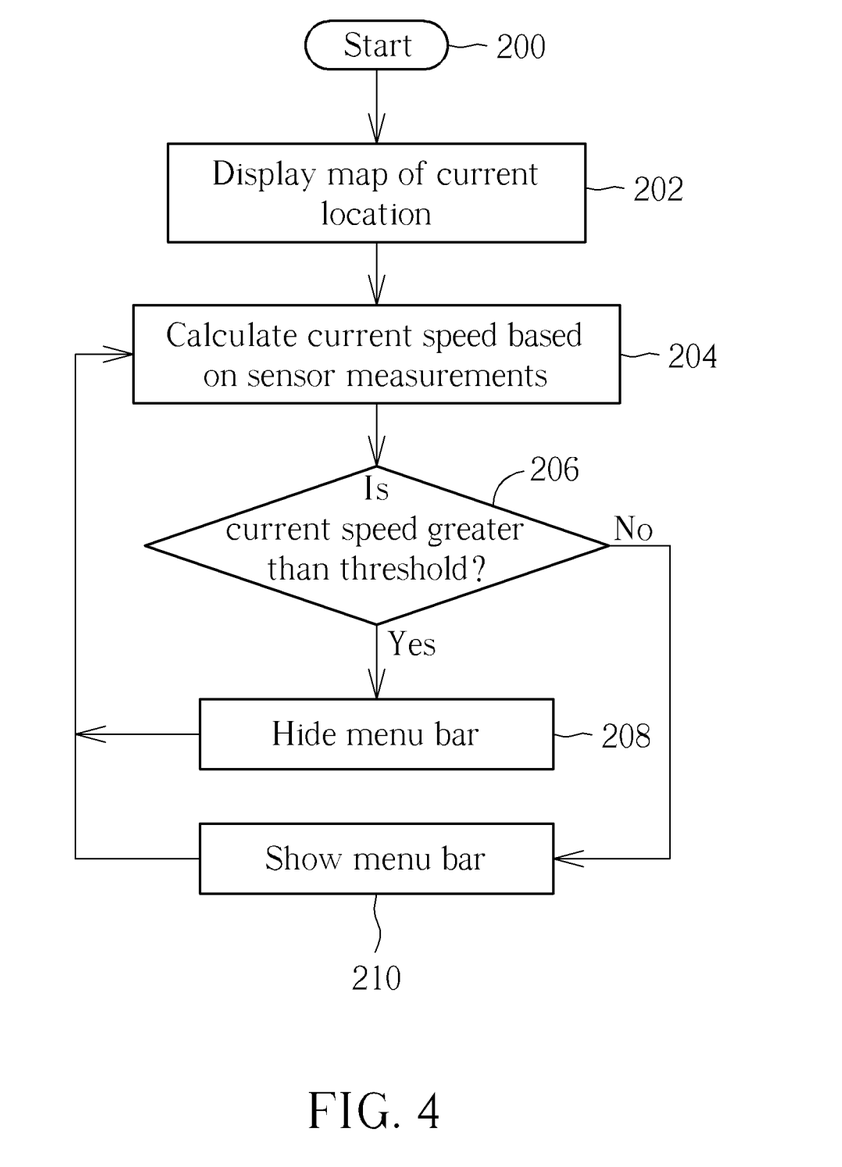
FIG. 4 is a flowchart illustrating the present invention method for adjusting map data and menu information using the portable electronic device.

Please refer to FIG. 4. FIG. 4 is a flowchart illustrating the present invention method for adjusting map data and menu information using the portable electronic device 10. Steps contained in the flowchart will be explained below.

Step 200: Start.

Step 202: The display 40 of the portable electronic device 10 shows a map of the current location.

Step 204: The processor 30 calculates the current speed of the portable electronic device 10 based on information received from the sensor module 20.

Step 206: Determine if the current speed is greater than the predetermined threshold. If so, go to step 208. If not, go to step 210.

Step 208: Hide the menu bar 130 and increase the size of the map area 110 accordingly. The menu bar 130 may be completely hidden or may be optionally replaced with the icon 133 shown in FIG. 3. Return to step 204.

Step 210: Show the menu bar 130 on the display 40. Return to step 204.

In short, the present invention hides the menu bar 130 when the current speed of the portable electronic device 10 (or the current speed of the vehicle in which the portable electronic device 10 is traveling in) is greater than the predetermined threshold. When the vehicle is parked or is driving at low speeds, the menu bar 130 will be displayed. Once the current speed exceeds the predetermined threshold, the menu bar 130 will be hidden and the size of the map area 110 will increase to fill in the space previously occupied by the menu bar 130. Then, once the vehicle speed is later reduced to being less than the predetermined threshold, the menu bar 130 reappears.

Hiding the menu bar 130 not only allows the map area 110 to have a larger space for the user to look at, but it also increases the safety of operating the portable electronic device 10. When a driver is traveling at high speeds, the driver should not be trying to operate the portable electronic device 10. Therefore, by hiding the menu bar 130 when the current speed is greater than the predetermined threshold, the driver is not tempted to control the portable electronic device 10, thereby lowering the risk of the driver having an accident. Since there may be times where a passenger wishes to operate the portable electronic device 10 instead of the driver while the vehicle is moving at high speeds, the icon 133 can optionally be made available for selection. When the icon 133 is selected, the icon brings up the menu bar 130 for allowing the user to access the functions contained in the menu bar 130.

Figure 5:
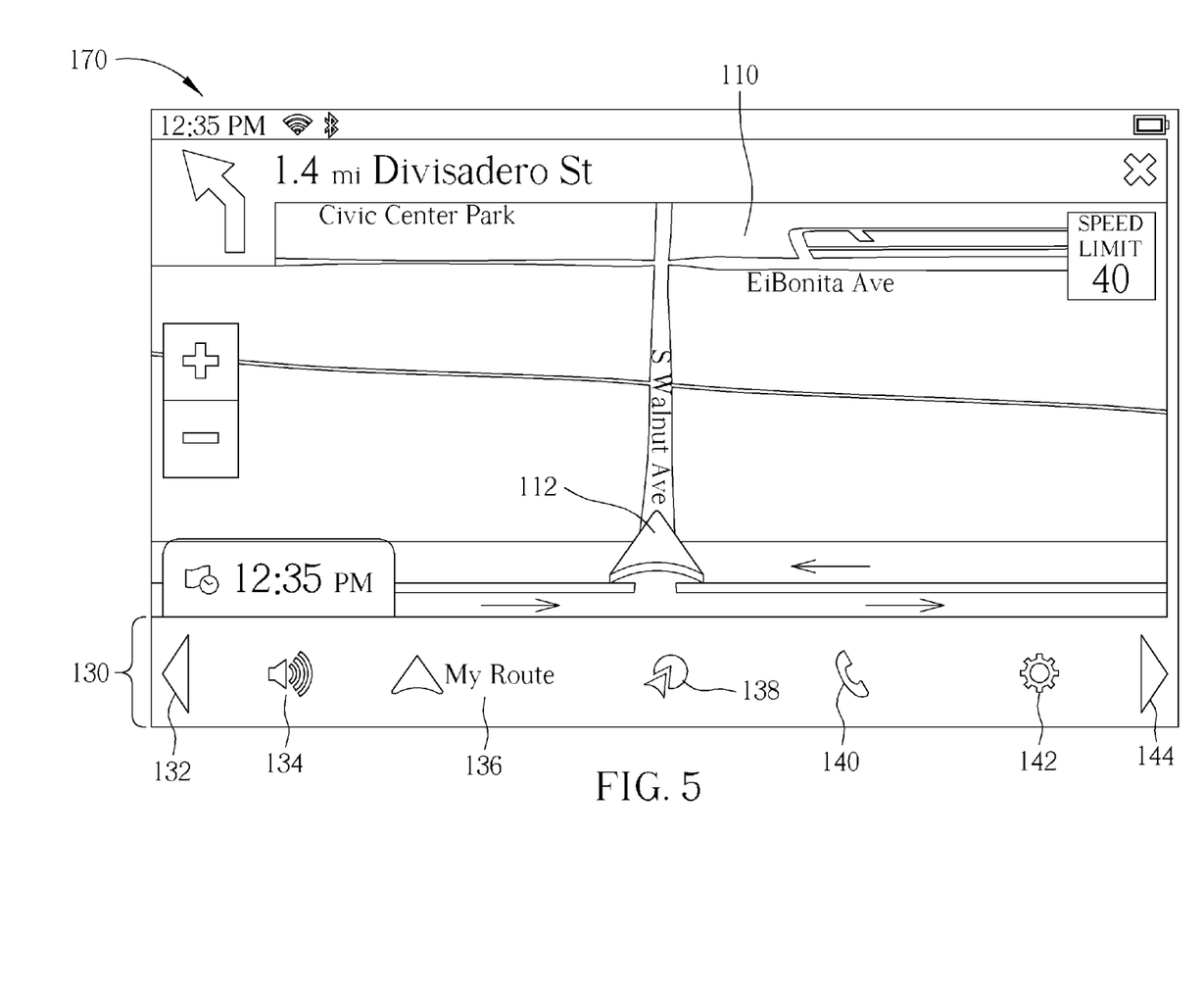
FIG. 5 is a diagram illustrating a screen shown on the display of the portable electronic device in which the POI area has been completely removed from the screen.

Please refer to FIG. 5. FIG. 5 is a diagram illustrating a screen 170 shown on the display 40 of the portable electronic device 10 in which the POI area 120 has been completely removed from the screen 170 by pressing icon 144 on the menu bar 130. The size of the POI area 120 can be modified such that zero, two, four, six, or eight blocks are displayed in the POI area 120. These numbers are provided as an example, and should not be interpreted as limiting the present invention. Since no POI area 120 is shown in FIG. 5, the map area 110 has additional space available on the right side of the screen 170.

Figure 6:
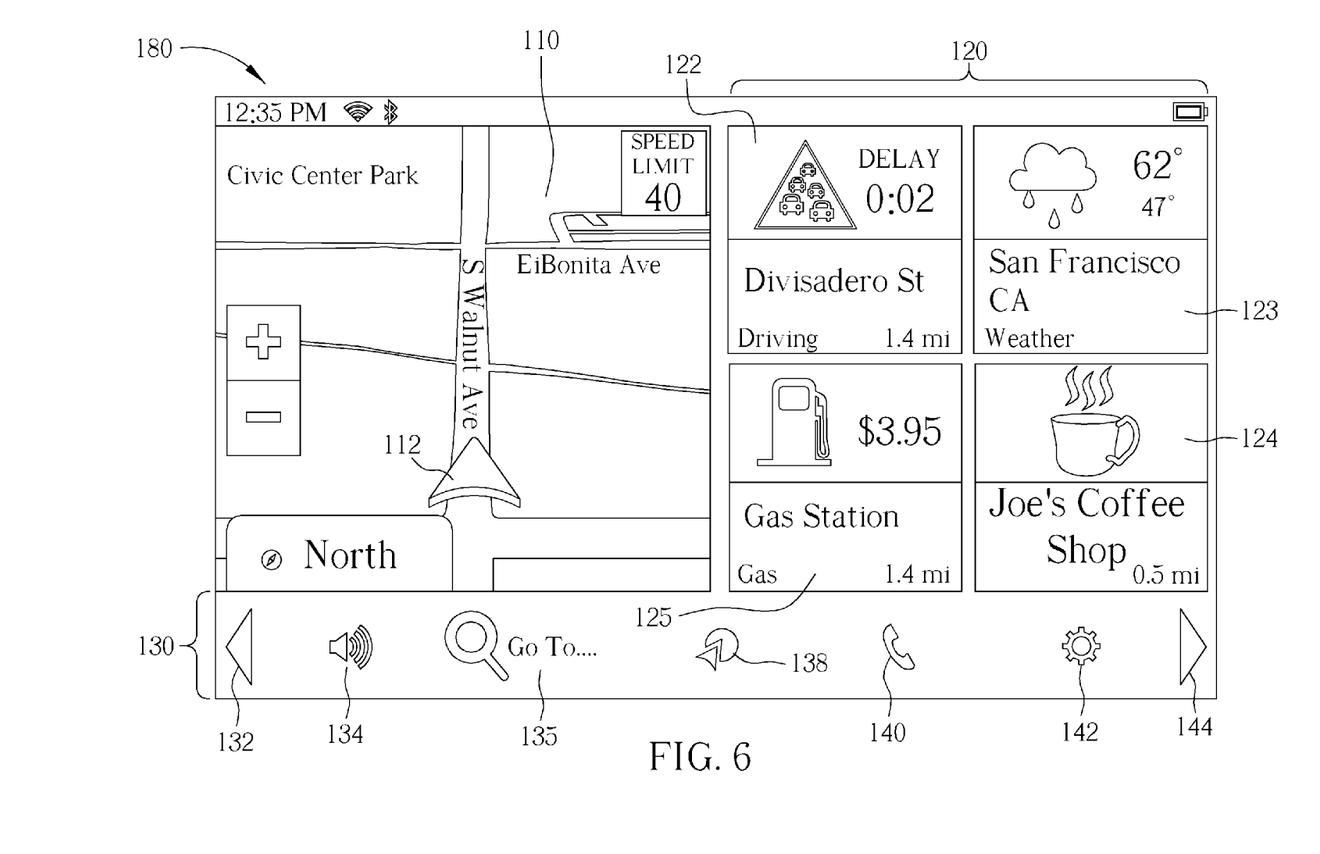
FIG. 6 is a diagram illustrating a screen shown on the display of the portable electronic device in which the POI area contains four blocks.

Please refer to FIG. 6. FIG. 6 is a diagram illustrating a screen 180 shown on the display 40 of the portable electronic device 10 in which the POI area 120 contains four blocks 122, 123, 124, 125. Besides blocks 122 and 124 which were explained with respect to FIG. 2 above, block 123 contains current weather information and block 125 contains information regarding a nearby gas station. Also, the icon 136, which allows the user to check on or modify the route that the user is currently traveling on, is replaced with icon 135. Icon 135 is present when the user has not input a destination into the portable electronic device 10, and pressing icon 135 allows the user to specify a destination for a route to travel on.

Figure 7:
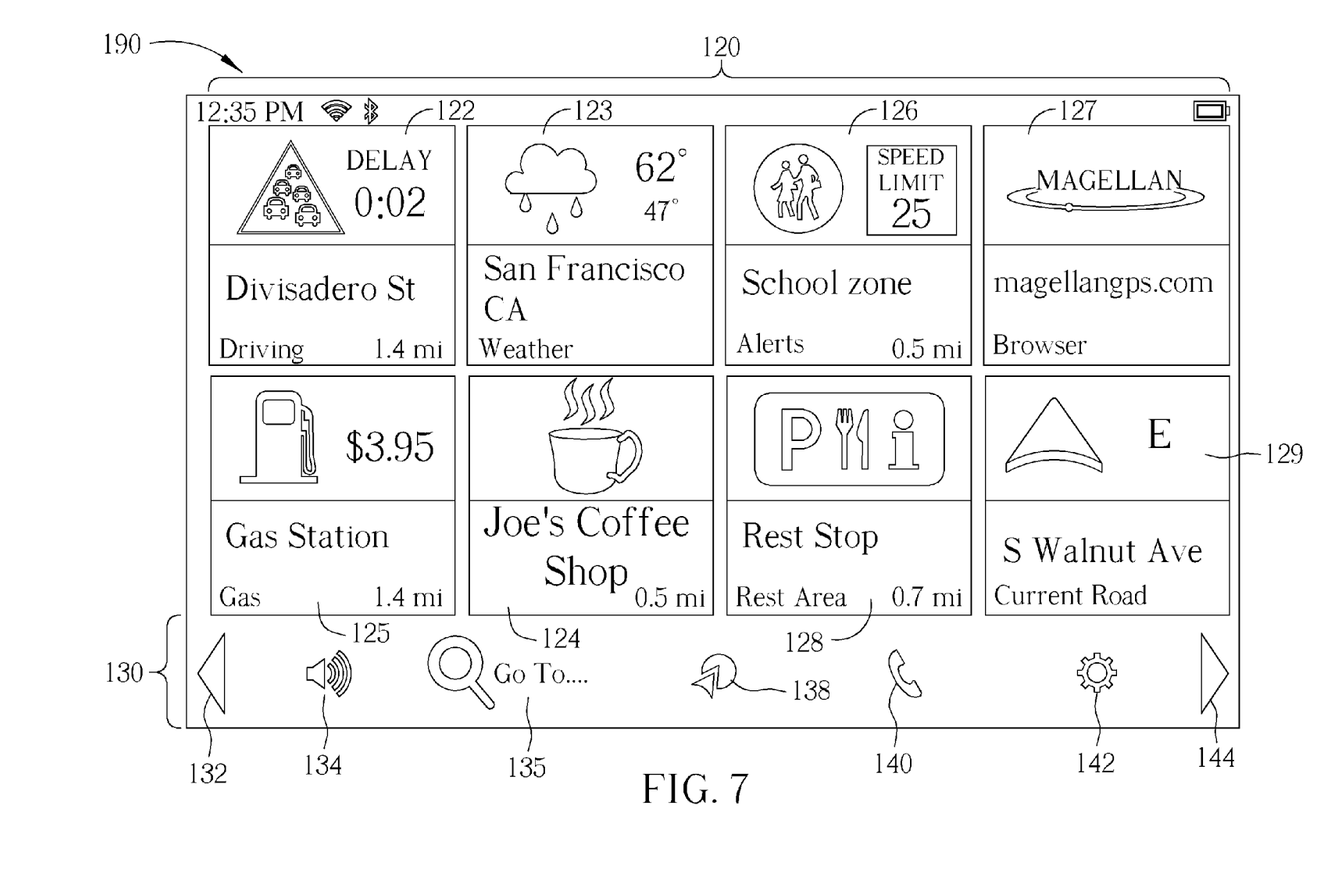
FIG. 7 is a diagram illustrating a screen shown on the display of the portable electronic device in which the POI area contains eight blocks.

Please refer to FIG. 7. FIG. 7 is a diagram illustrating a screen 190 shown on the display 40 of the portable electronic device 10 in which the POI area 120 contains eight blocks 122, 123, 124, 125, 126, 127, 128, 129. Besides blocks 122, 123, 124, and 125 explained above, block 126 contains an alert regarding a nearby school zone, block 127 contains information regarding an internet browser for the portable electronic device 10, block 128 contains information regarding a nearby rest stop, and block 129 contains information about the road that the user is currently driving on. Again, the icons 132 and 144 can be used to adjust the number of blocks shown in the POI area 120.

Optionally, the transparency of the POI area 120 can be adjusted when the current speed of the portable electronic device 10 is greater than the predetermined threshold. By making the POI area 120 transparent, the user can be given the opportunity to view map data contained in a portion of the map area 110 located under the POI area 120. The POI area 120 can be made transparent, can be hidden, or can be kept unchanged for displaying the contents of the POI area 120 for any current speed of the portable electronic device 10, or only when the current speed of the portable electronic device 10 is greater than the predetermined threshold. In this way, the data in the POI area 120 can avoid distracting the driver of the vehicle.

In summary, the present invention provides a way to automatically adjust both the map area 110 and the menu bar 130 shown on the display 40 of the portable electronic device 10. Not only is the map area maximized when the current speed of the portable electronic device 10 is greater than the threshold value, but safety is also ensured by hiding the menu bar 130 and discouraging the user from selecting menu items while the speed of the portable electronic device 10 is greater than the threshold value.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of adjusting a map area displayed on a portable electronic device, the method comprising:
    displaying a map of a current location of the portable electronic device on a display of the portable electronic device;
    calculating a current speed of the portable electronic device; and
    adjusting data shown on the display by making a menu bar and related indicators of the menu bar not visible and increasing a size of the displayed map when the current speed of the portable electronic device is greater than a threshold value, wherein when the menu bar is visible the menu bar contains at least one control icon for controlling the operation of the electronic device.

2. The method of claim 1, wherein a user of the portable electronic device is prevented from accessing the menu bar when the current speed of the portable electronic device is greater than the threshold value.

3. The method of claim 1, wherein the menu bar is completely hidden and inaccessible when the current speed of the portable electronic device is greater than the threshold value.

4. The method of claim 3, wherein the displayed map expands to fill in space previously occupied by the menu bar when the menu bar is hidden while the current speed of the portable electronic device is greater than the threshold value.

5. The method of claim 1, wherein the menu bar reappears and the size of the displayed map is decreased when the current speed of the portable electronic device decreases to being lower than the threshold value.

6. The method of claim 5, wherein the menu bar is displayed at a bottom edge of the display of the portable electronic device when the current speed of the portable electronic device is lower than the threshold value.

7. The method of claim 1, wherein the portable electronic device is a personal navigation device or a mobile phone.

8. A portable electronic device for adjusting a displayed map area, the portable electronic device comprising:
- a display for displaying a map of a current location of the portable electronic device;
- a memory for storing map data; and
- a processor for calculating a current speed of the portable electronic device, and adjusting data shown on the display by making a menu bar and related indicators of the menu bar not visible and increasing a size of the displayed map when the current speed of the portable electronic device is greater than a threshold value, wherein when the menu bar is visible the menu bar contains at least one control icon for controlling the operation of the electronic device.

9. The portable electronic device of claim 8, wherein a user of the portable electronic device is prevented from accessing the menu bar when the current speed of the portable electronic device is greater than the threshold value.

10. The portable electronic device of claim 8, wherein the menu bar is completely hidden and inaccessible when the current speed of the portable electronic device is greater than the threshold value.

11. The portable electronic device of claim 10, wherein the displayed map expands to fill in space previously occupied by the menu bar when the menu bar is hidden while the current speed of the portable electronic device is greater than the threshold value.

12. The portable electronic device of claim 8, wherein the menu bar reappears and the size of the displayed map is decreased when the current speed of the portable electronic device decreases to being lower than the threshold value.

13. The portable electronic device of claim 12, wherein the menu bar is displayed at a bottom edge of the display of the portable electronic device when the current speed of the portable electronic device is lower than the threshold value.

14. The portable electronic device of claim 8 being a personal navigation device or a mobile phone.

* * * * *